US006395362B1

(12) United States Patent
Pacione

(10) Patent No.: US 6,395,362 B1
(45) Date of Patent: *May 28, 2002

(54) ANCHOR SHEET FRAMEWORK AND SUBFLOORING

(75) Inventor: Joseph R. Pacione, Thornhill (CA)

(73) Assignee: Tac-Fast Georgia, L.L.C., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/008,584

(22) Filed: Jan. 16, 1998

Related U.S. Application Data

(63) Continuation-in-part of application No. 08/850,726, filed on May 2, 1997, and a continuation-in-part of application No. 08/684,004, filed on Jul. 19, 1996, now abandoned.

(51) Int. Cl.[7] .................................................. B32B 3/00

(52) U.S. Cl. ............................ 428/45; 428/58; 428/62; 428/95; 428/100; 52/506.05; 52/391; 52/DIG. 13

(58) Field of Search ........................ 52/311.2, 385–387, 52/391, 506.05, 511, 582.1, 698, DIG. 13; 428/45, 58, 60, 62, 88, 95, 100; 16/4, 6, 8, 16, 17.1

(56) References Cited

U.S. PATENT DOCUMENTS

| | | | | |
|---|---|---|---|---|
| 2,012,929 | A | | 8/1935 | Knowland |
| 3,247,638 | A | | 4/1966 | Gay, Jr. |
| 3,574,019 | A | | 4/1971 | Girard |
| 3,775,856 | A | | 12/1973 | Schmidt |
| 3,817,015 | A | | 6/1974 | Frangos |
| 3,866,267 | A | | 2/1975 | Poletti |
| 4,405,668 | A | | 9/1983 | Wald |
| 4,489,115 | A | * | 12/1984 | Layman et al. ............... 428/62 |
| 4,557,774 | A | | 12/1985 | Hoopengardner |
| 4,649,069 | A | | 3/1987 | Tone |

(List continued on next page.)

FOREIGN PATENT DOCUMENTS

| | | | |
|---|---|---|---|
| AU | 40926/72 | | 10/1973 |
| BE | 853033 | | 7/1997 |
| DE | 7029524 | | 8/1970 |
| DE | 2012523 | | 2/1972 |
| DE | 2201231 | | 7/1973 |
| DE | 2803006 | | 8/1979 |
| DE | 4228597 | | 3/1994 |
| DE | 19532685 | | 3/1997 |
| FR | 2328432 | | 5/1977 |
| FR | 2362257 | * | 3/1978 |
| FR | 2582210 | | 11/1986 |
| FR | 2747605 | | 10/1997 |
| GB | 1024886 | * | 9/1970 |
| GB | 1376262 | | 12/1974 |
| GB | 1546901 | | 3/1979 |
| JP | 5374719 | | 7/1978 |
| JP | 5981479 | | 6/1984 |
| WO | 8601247 | | 2/1986 |
| WO | 9503723 | | 2/1995 |
| WO | 9803104 | | 1/1998 |

OTHER PUBLICATIONS

Figure of Japan 53–74719 dated Jul. 3, 1999.

*Primary Examiner*—Robert Canfield
(74) *Attorney, Agent, or Firm*—Brian W. Gray

(57) ABSTRACT

An anchor sheet subfloor that includes a laminate having an upper layer of relatively thin flexible rigid sheet material and a bottom layer of a relatively resilient cushioning material. The upper sheet layer can be formed of a plastic or polymer material. In one arrangement, the sheet can be cut and fit within the boundaries of a room and the sheet has sufficient rigidity and mass to remain without distortion or buckling within the room by free floating on the existing floor without substantial attachment to the floor. It can be possible for a sheet to be cut and fit on site to fit the contours of a room to form by itself or in combination wit other anchor sheets a free floating smooth subfloor on which can be overlaid decorative covering pieces.

5 Claims, 14 Drawing Sheets

U.S. PATENT DOCUMENTS

| | | | | | |
|---|---|---|---|---|---|
| 4,671,976 | A | | 6/1987 | Vidal | |
| 4,673,603 | A | | 6/1987 | Roth | |
| 4,766,022 | A | | 8/1988 | Tone | |
| 4,769,895 | A | | 9/1988 | Parkins | |
| 4,810,546 | A | | 3/1989 | McLaughlin | |
| 4,822,658 | A | | 4/1989 | Pacione | |
| 4,824,498 | A | | 4/1989 | Goodwin et al. | |
| 4,968,548 | A | * | 11/1990 | Gibson et al. | 428/95 |
| 4,974,384 | A | | 12/1990 | Pacione | |
| 5,042,221 | A | | 8/1991 | Pacione | |
| 5,045,389 | A | | 9/1991 | Campagna | |
| 5,060,443 | A | | 10/1991 | Pacione | |
| 5,116,439 | A | * | 5/1992 | Raus | 156/71 |
| 5,133,166 | A | | 7/1992 | Pacione | |
| 5,144,786 | A | | 9/1992 | Pacione | |
| 5,149,573 | A | * | 9/1992 | Kobe et al. | 428/93 |
| 5,191,692 | A | | 3/1993 | Pacione | |
| 5,200,245 | A | | 4/1993 | Brodrick, Jr. | |
| 5,259,163 | A | | 11/1993 | Pacione | |
| 5,382,462 | A | | 1/1995 | Pacione | |
| 5,479,755 | A | | 1/1996 | Pacione | |
| 5,482,755 | A | * | 1/1996 | Manning | 428/95 |
| 5,529,825 | A | | 6/1996 | Sutherland | |
| 5,654,066 | A | * | 8/1997 | Pacione | 428/95 |
| 5,672,404 | A | * | 9/1997 | Callahan | 428/100 |
| 5,691,026 | A | * | 11/1997 | Zinke et al. | 428/100 |
| 5,723,195 | A | * | 3/1998 | Pacione | 428/100 |
| 5,753,336 | A | * | 5/1998 | Stull | 428/86 |
| 5,863,637 | A | | 1/1999 | Mansson et al. | |
| 5,902,663 | A | | 5/1999 | Justesen et al. | |

* cited by examiner

ANCHOR SHEET FRAMEWORK AND SUBFLOORING

RELATED APPLICATION

This is a continuation in part of application Ser. No. 08/684,004 filed Jul. 19, 1996, now abandoned and application No. 08/850,726 filed May 2, 1997.

INTRODUCTION TO THE INVENTION

This invention relates to the installation of decorative coverings. It has been shown in the present inventor's first patent U.S. Pat. No. 4,822,658 that carpets having a looped backing can be conveniently installed on a floor by the use of complementary hooked tape. One of the primary ways disclosed in that patent is attaching the tape to the floor at the perimeter and seams (hereinafter "perimeter and seam" installation). The present inventor has also developed an anchor sheet which is described in U.S. patent application Ser. No. 08/685,004 filed Jul. 19, 1996 and continuation-in-part application Ser. No. 08/850,726 filed May 2, 1997 (the specifications of which are herein incorporated by reference). Rather thin attaching the carpet directly to a hooked tape attached to the floor, an intermediate thin flexible relatively rigid anchor sheet is provided which gives rigidity and integrity and mass to the overlying pieces of carpet covering. The anchor sheet can be covered in hooks. The carpet has an underlying looped backing for attachment to the hooks. The carpet can be in pieces which overlap the anchor sheet pieces to provide rigidity and strength to the total unit.

The perimeter and seam method and the anchor sheet structure and method can both be used and will both work. However in some circumstances it may be advisable to use a combination of both methods in which a form of anchor sheet provides a stable framework into which either a cushion or a covering material or both can be inserted either attached to the floor by a hook and loop attachment method or as a "free float" within the framework. In these circumstances, the anchor sheet can be a support for a covering unit attached to the anchor sheet by hook and loop as shown in the earlier related cases. Carpet within the framework can then be installed with hook and loop or in a conventional manner, i.e., without hook and loop, by glue down or even by free floating.

In some circumstances the hook tape of a perimeter and scam installation can be the "framework" within which an anchor sheet installation can be made. In this case the anchor sheet may float within the framework created by hook tape attached to a floor. Additional methods of attaching a tape framework and a tape framework construction are disclosed as well as other methods of installing an anchor sheet as a framework, including the use of a form or jig.

BACKGROUND OF THE INVENTION

The need for flexibility in installing floor coverings is well known. Most floor coverings must be cut and fit on site and therefore must be flexible to provide for different physical limitations In addition subflooring and supporting substrates differ widely in both quality and type, even in new construction In old construction existing flooring may reman and present problems.

The background to the invention is substantially shown in the present inventor's prior issued patents U.S. Pat. No. 4,822,658 (Apr. 18, 1989, Pacione); U.S. Pat. No. 5,191,692 (Mar. 9, 1993, Pacione); U.S. Pat. No. 5,382,462 (Jan. 17, 1995, Pacione); and U.S. Pat. No. 5,479,755 (Jan. 2, 1996, Pacione). In addition attempts to make structural semi-permanent flooring and wall material incorporating a hook surface is also disclosed in the present inventor's earlier anchor board system U.S. Pat. No. 5,060,443 (Oct. 29, 1991, Pacione); U.S. Pat. No. 5,259,163 (Nov. Pat. No. 9, 1993, Pacione); and U.S. Pat. No. 5,144,786 (Sep. 8, 1992, Pacione).

SUMMARY OF THE INVENTION

A thin rigid but flexible anchor sheet has advantages to stabilize the overlying carpet to provide a relatively rigid subfloor for installation of an overlying carpet. When a resilient backing of cushioning material is attached to or supplied under such anchor sheet, the anchor sheet provides a novel subfloor which has significant advantages over existing underpads.

We have described the anchor sheet as both "flexible" and "rigid". It is flexible in the sense that over a reasonable length it can bend and in most circumstances can even be rolled with a radius of curvature for example of perhaps 1 or 4 inches unlike for example plywood. It is rigid in the sense that if held at one end it can support itself for instance over a distance of 12–24 inches without drooping unlike a cloth or fabric tape.

It is not commonly appreciated that an underpad, while it provides resiliency, can lead to degradation in the overlying decorative textile surface. This is because the resiliency allows for the carpet to deform when walked upon or when furniture or other items are placed on the carpet. This deformation can, if it is not properly supported from below, result in crushing and eventual deterioration of the carpet structure.

The anchor sheet of this invention has a relatively rigid yet flexible thin sheet material, preferably a plastic or of a polymer material such as a polyester, polycarbonate, polypropylene or even a graphite or other advanced polymer material overlying a resilient cushion. This structure provides a surprising amount of resiliency and cushioning to the carpet. However because the overlying anchor sheet is relatively rigid, the carpet fibres are protected from crushing and therefore the life of the carpet is significantly extended while still appearing to have a sufficient degree of resiliency.

In order to provide the proper degree of resilience in the hooks and the proper degree of rigidity to the sheet, the hooks and sheets may need to be made from, for example, different plastic materials by lamination or coextrusion.

To the inventor's knowledge no person, until disclosed in this and the earlier related applications, has had the relatively unconventional idea of covering a resilient material with a thin flexible relatively rigid sheet material.

Thus the invention comprises in, one aspect, an anchor sheet subfloor comprising a laminate having an upper layer of a relatively thin and flexible rigid sheet material and a bottom layer of a relatively resilient cushioning material.

While not as pronounced, the advantages of a relatively rigid but flexible anchor sheet to create a smooth subfloor and to tie overlying carpet pieces together into a stable mass can to some extent be achieved even without a resilient undercushioning. Thus the invention comprises in another aspect a relatively thin flexible rigid sheet material preferably of plastic or polymer which can be cut and fit on site to fit the contours of a room or other area to be covered to form by itself or in combination with other anchor sheets a free floating smooth subfloor on which can be laid decorative covering pieces.

In another aspect the invention comprises a carpet and subfloor comprising a first layer of relatively resilient cushioning material overlaying the floor. A second layer of a thin flexible rigid polymer material overlaying the first layer and hooks covering at least a portion of the top surface of the second layer and a carpet having an undersurface covered in loops and detachably attached to the hooks covering the second layer to form a coherent stable carpet structure.

In another aspect, the subfloor and structure created by the first resilient layer and the second layer of anchor sheet, can be covered across its surface by perimeter and seam hooked tape so as to allow for installation of a carpet on the subfloor in accordance with the method described in U.S. Pat. No. 4,822,658. In this case the subfloor is actually not attached to the floor directly but is normally "floating" but this may be sufficient, in many installations, to stabilize the carpet.

As previously described, in some circumstances, the anchor sheet can act as g framework for either a carpet or an underpad or both, Thus, in another aspect, the invention covers an anchor sheet, carpet and an underpad combination for installing a carpet or underpad onto a floor comprising an anchor sheet installed along the perimeter of an area to be covered, describing and bounding that area, hook tape attached to the sheet along the perimeter of the upper face of the anchor sheet and a resilient underpad of a height matching the height of the anchor sheet sized to fit within the area bounded by the anchor sheet. A carpet having an underside covered in loops can then be overlaid. The anchor sheet perimeter and the resilient underpad may be either free floating or installed in a conventional manner within the anchor sheet framework.

A more complex anchor sheet framework can also be formed consisting of modular covering units made as disclosed in related application Ser. No. 08/850,726. Thus in another aspect the invention comprises a modular framework for carpet installation comprising a plurality of covering modules having decorative coverings attached to a thin flexible rigid anchor sheet so as to leave exposed overlapping areas of anchor sheet or covering for detachable attachment and interlocking relationship to an adjoining module as disclosed in related application Ser. No. 08/850,726. In this aspect of the invention, the modules are then detachably interlocked to define and enclose an area. Carpet or underpad or carpet and underpad depending upon the height of the framework created, is then cut and fit within the area defined by the covering modules, As previously mentioned, an anchor sheet subfloor can also be installed within a perimeter bounded by hooked tape, in effect creating a hooked tape framework. In this aspect of the invention, a perimeter of hooked tape is attached to the floor. The tape may be of a form disclosed in, for instance, U.S. Pat. No. 5,382,462 or having a tape with a cushioned backing or a tape with a foundation sheet as disclosed in the present application.

In this aspect of the invention, a thin rind flexible anchor sheet having an upper surface having a plurality of hooks in which the anchor sheet or anchor sheet and cushion is substantially the same height as the tape can then be cut and fit within the area bounded by the hooked tape to provide for a surface underlayment over which a carpet or other decorative covering having a looped backing can be installed.

BRIEF DESCRIPTION OF THE DRAWINGS

Embodiments of the invention will now be described, reference being had to the accompanying drawings, wherein.

DESCRIPTION OF PREFERRED EMBODIMENTS

Figure 1:
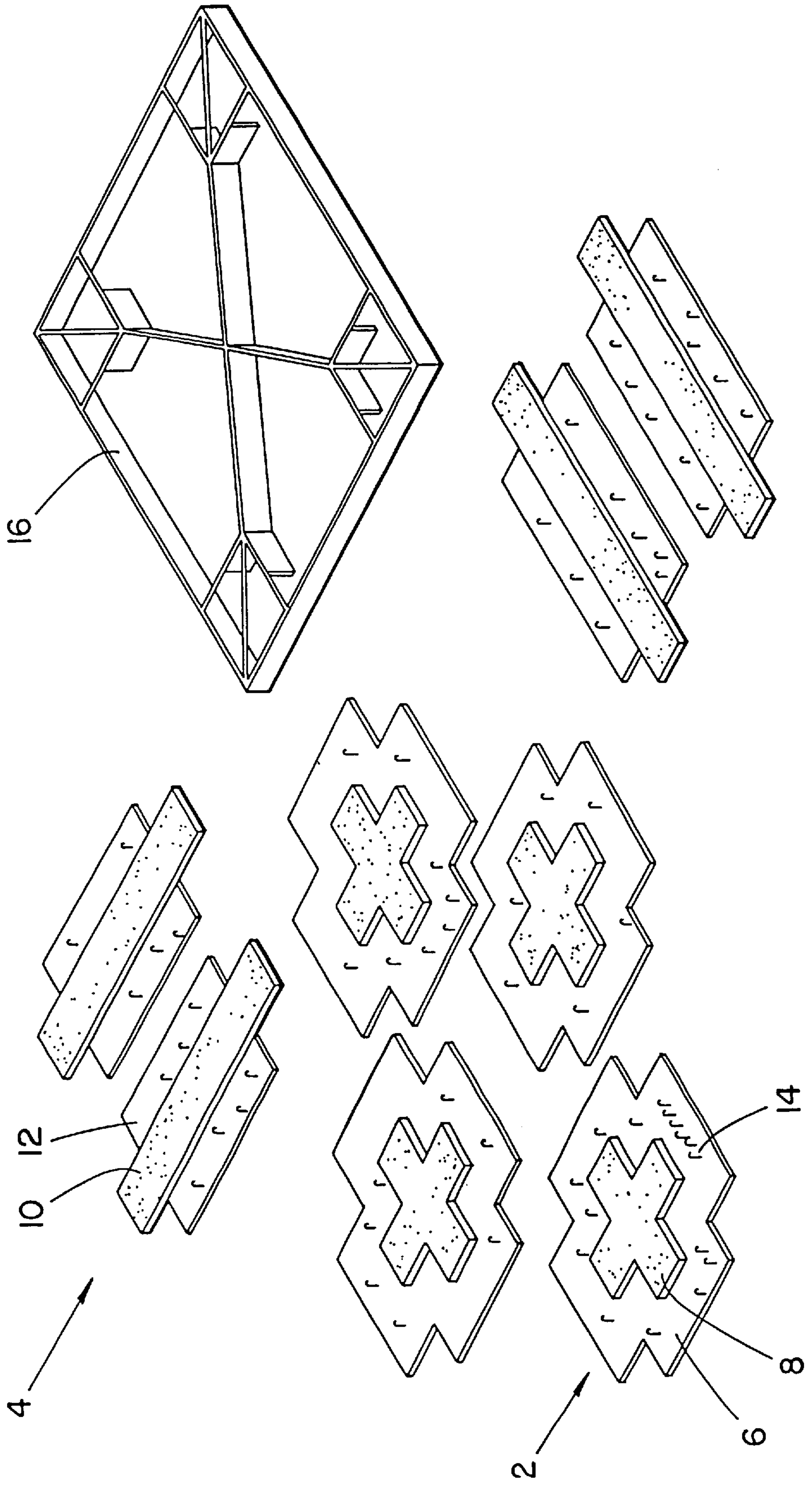
FIG. 1 shows covering modules and a jig for installation.
Figure 2:
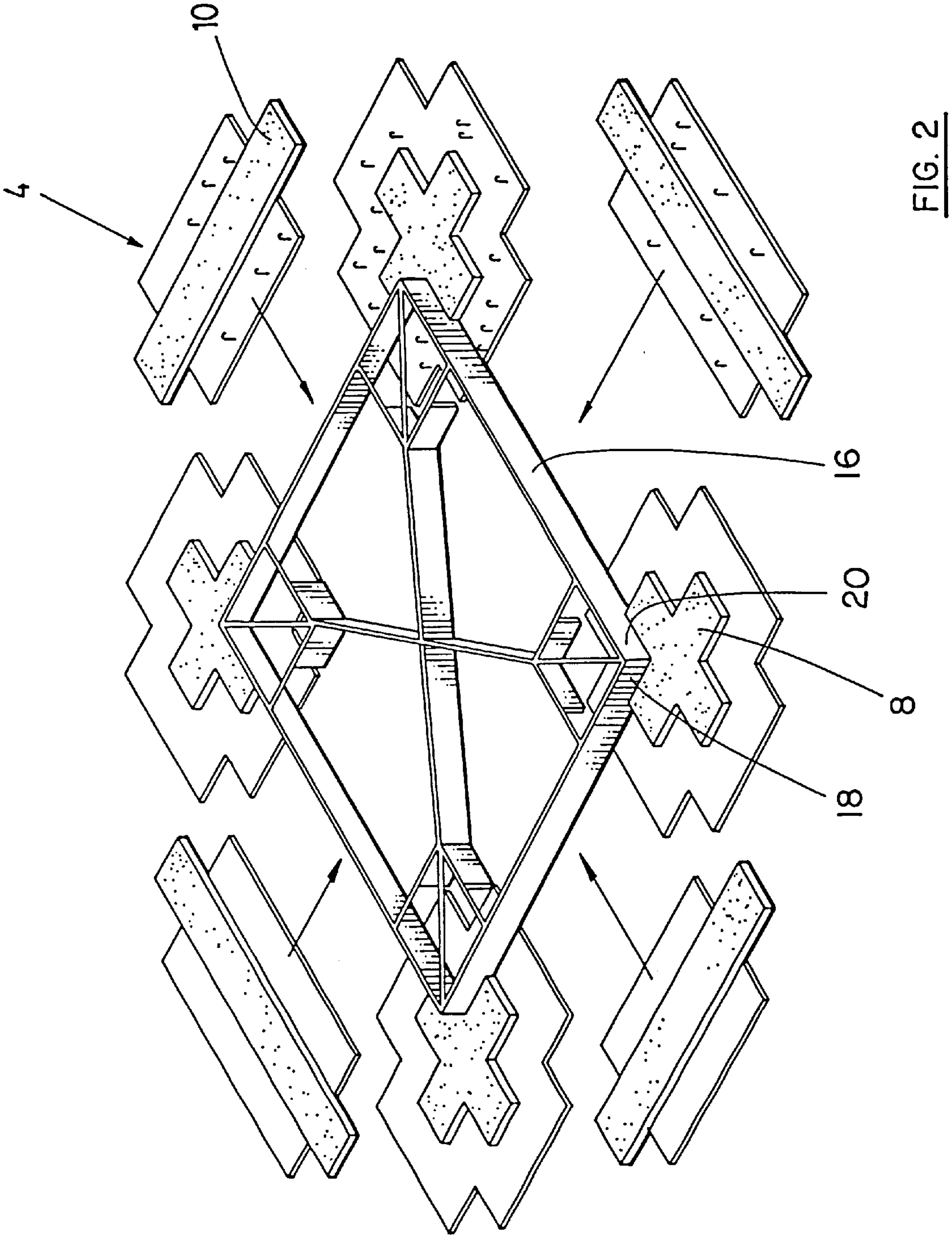
FIG. 2 shows the covering modules and jig in the process of installation to a floor.

In FIG. 1 is shown a variety of covering modules 2 and 4. These are similar to the type of covering modules disclosed in related case Ser. No. 08/850,726. In the case of covering module 2 there is an anchor sheet 6 larger than the decorative covering piece 8. In the case of covering module 4 there is a decorative covering piece 10 which overlaps the anchor sheet 12.

Normally the anchor sheet areas would be substantially covered in hooks 14 as shown in only representative detail. The overlapping pieces 10 will have on their undersurface loops (not shown) for attachment to the exposed hooks 14 of anchor sheet, for instance, 6.

A jig or pattern 16 is also shown in FIG. 1. Its use will become apparent.

Figure 3:
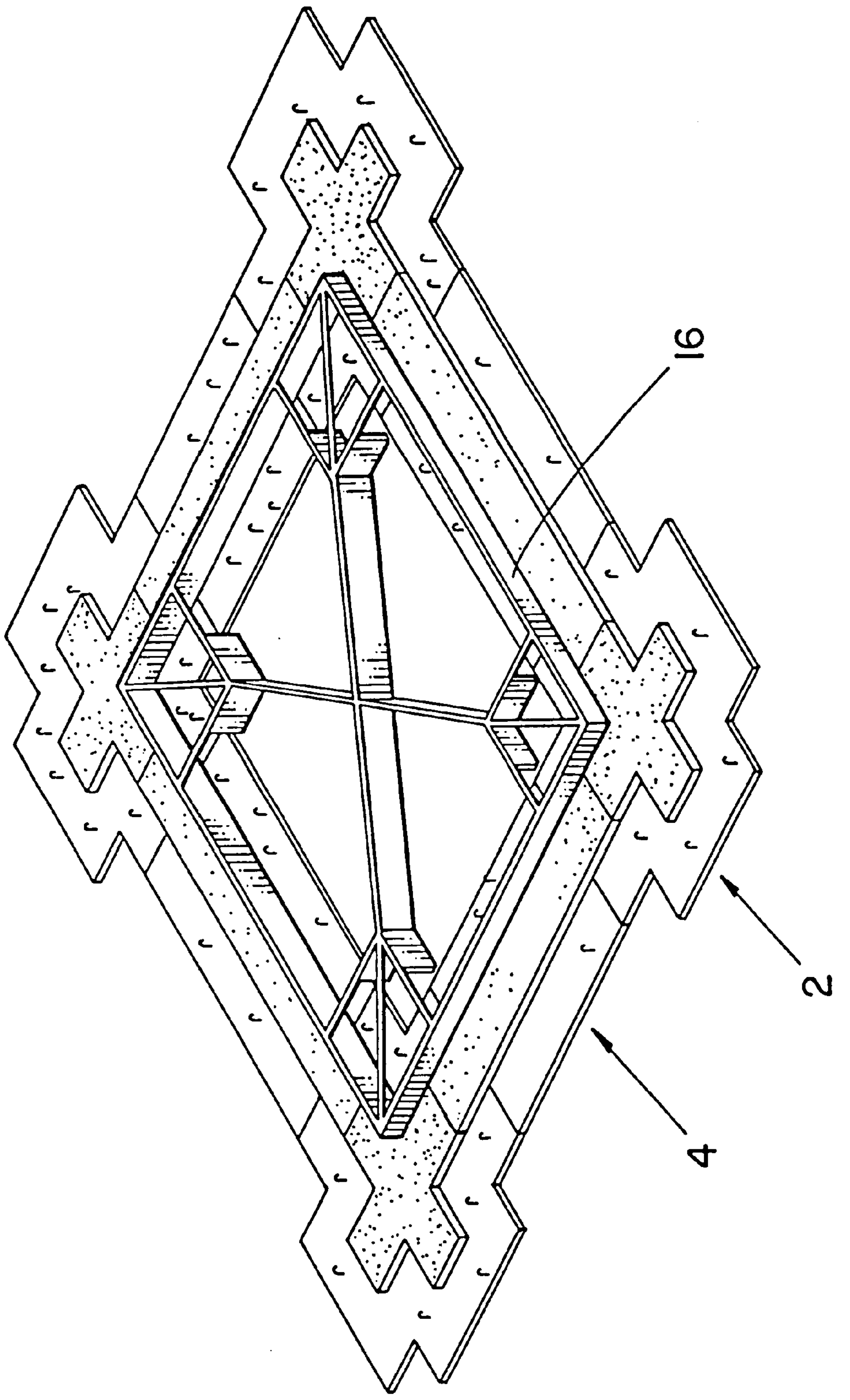
FIG. 3 shows the next step in installation of the covering module and jig.
Figure 4:
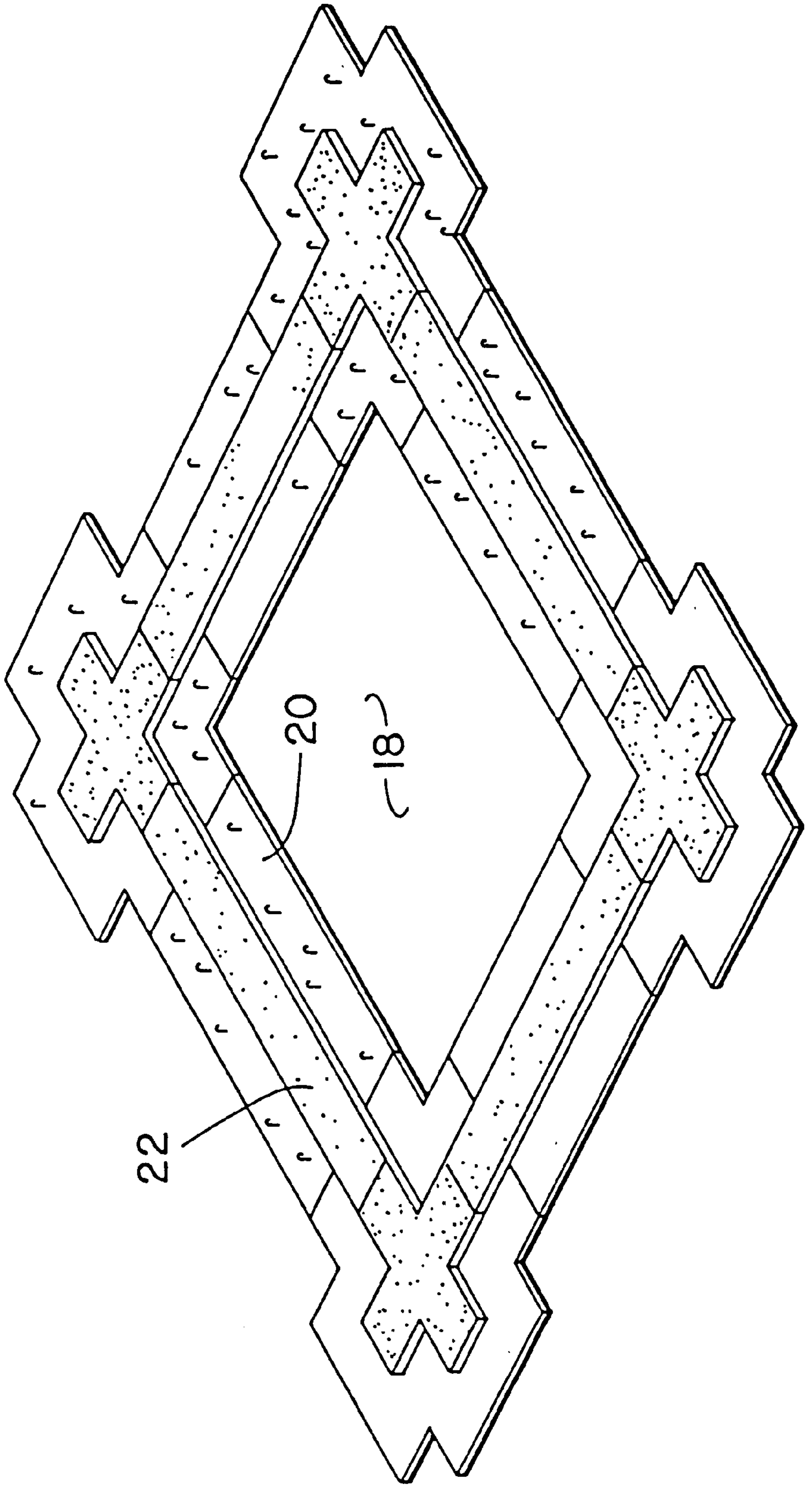
FIG. 4 shows the finished covering module framework.

The jig at 16 has corners for instance 18 and 19 which serve to locate the corresponding comers of decorative covering piece 8 at each of the four corners of the jig. Thus the covering modules are separated and appropriately spaced in the desired location. Covering module 4 cam then be inserted along the sides of the jig abutting the jig as shown. Loops on the undersurface of covering piece 10 (not shown) will enable the covering piece to be installed in detachable attachment in a manner shown in related case Ser. No. 08/850,726 preferably by the use of a smooth slip cover as disclosed in related U.S. patent application Ser. No. 08/850,726. The slip cover can be a hard smooth piece temporarily insert. It can then be removed and the covering modules will form a framework as shown in FIG. 3, in which pieces 4 and pieces 2 have combined to create a structure. Jig 16 is then removed as shown in FIG. 4 so that the anchor sheet framework now lies upon and circumscribes an area of floor 21 and also an area of hooked anchor sheet 20 which is at a different level than the surface of decorative covering 22.

Figure 5:
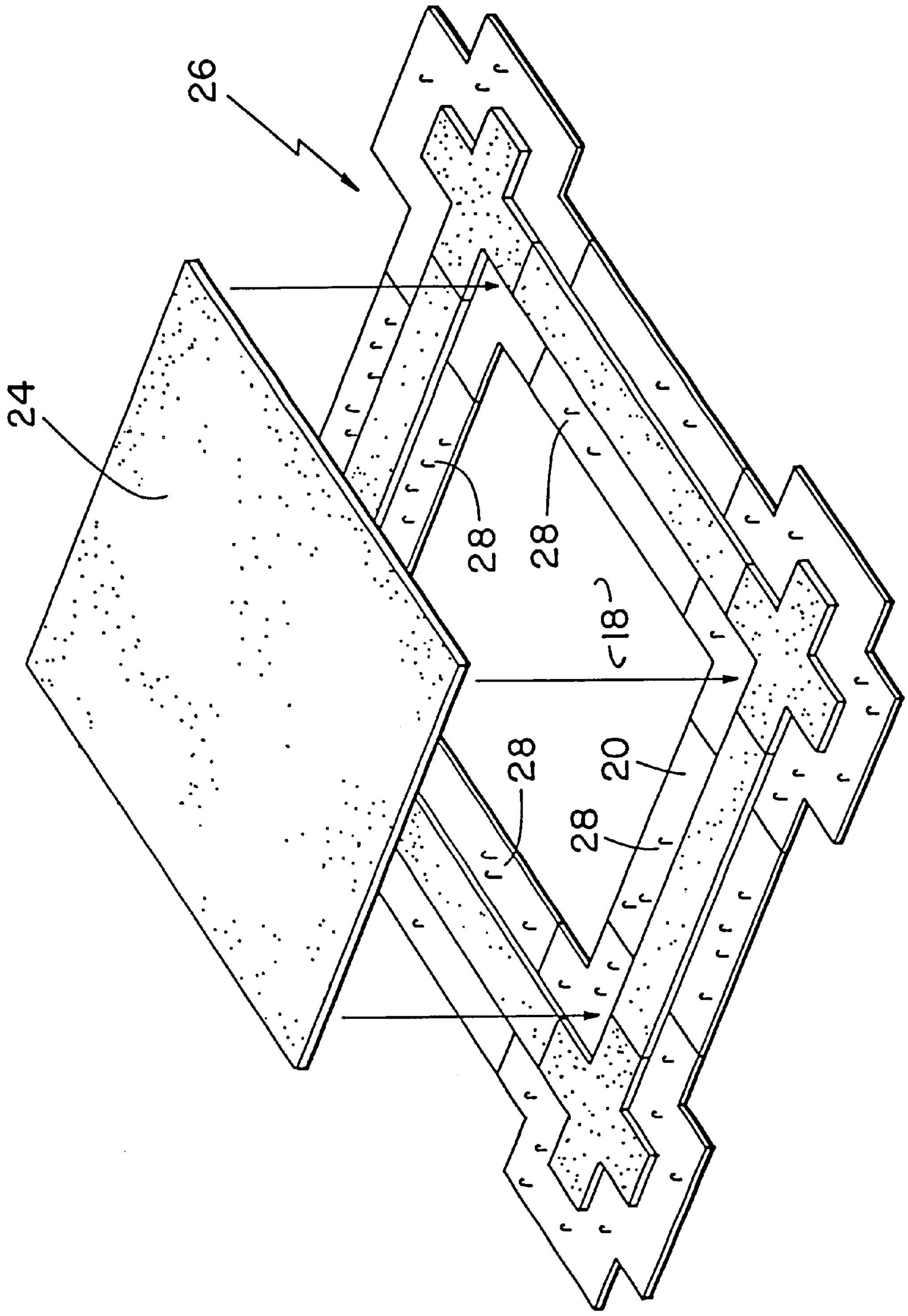
FIG. 5 shows the covering module framework at the commencement of the installation of an inserted cushion or carpet.

As shown in FIG. 5 a decorative covering unit 24 can be inserted into the framework 26. The unit may be carpet having a looped backing (not shown) in which case the carpet would be detachably attached to hooks 28 in the area shown. Normally the complete area would be covered in hooks but only representative samples are shown.

If desired the floor area 21 could be made level with the hooked area 28 by the use of an anchor sheet of suitable thickness, also covered with hooks or smooth, or by the installation of a pad. The area of floor 21 could be left empty because of the low profile of the hooked area 20.

Figure 6:
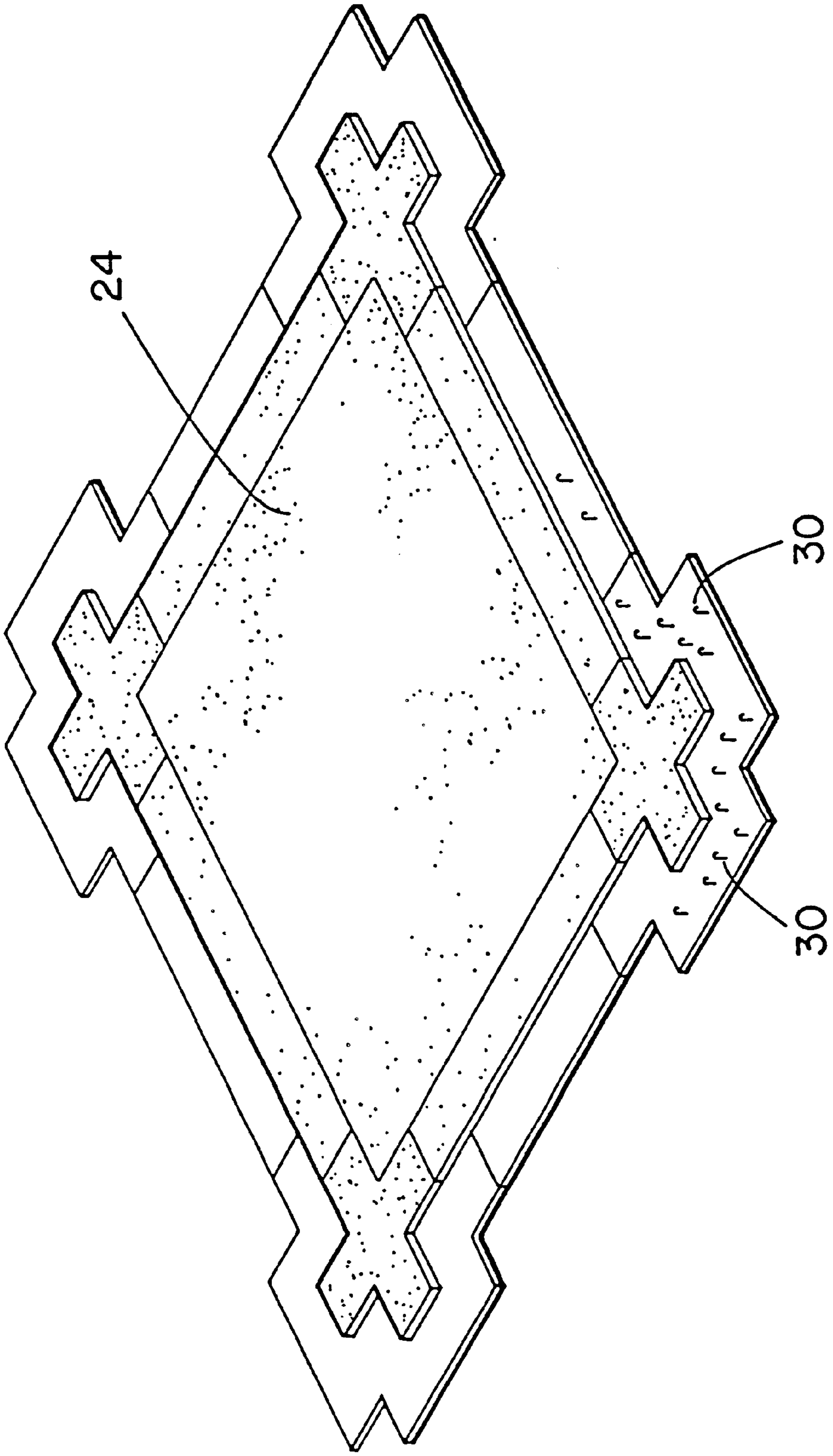
FIG. 6 shows the completed covering.

FIG. 6 shows the unfinished subunit which is ready to be attached by hooks 30 to other adjoining anchor sheet units or covering modules.

Figure 7:
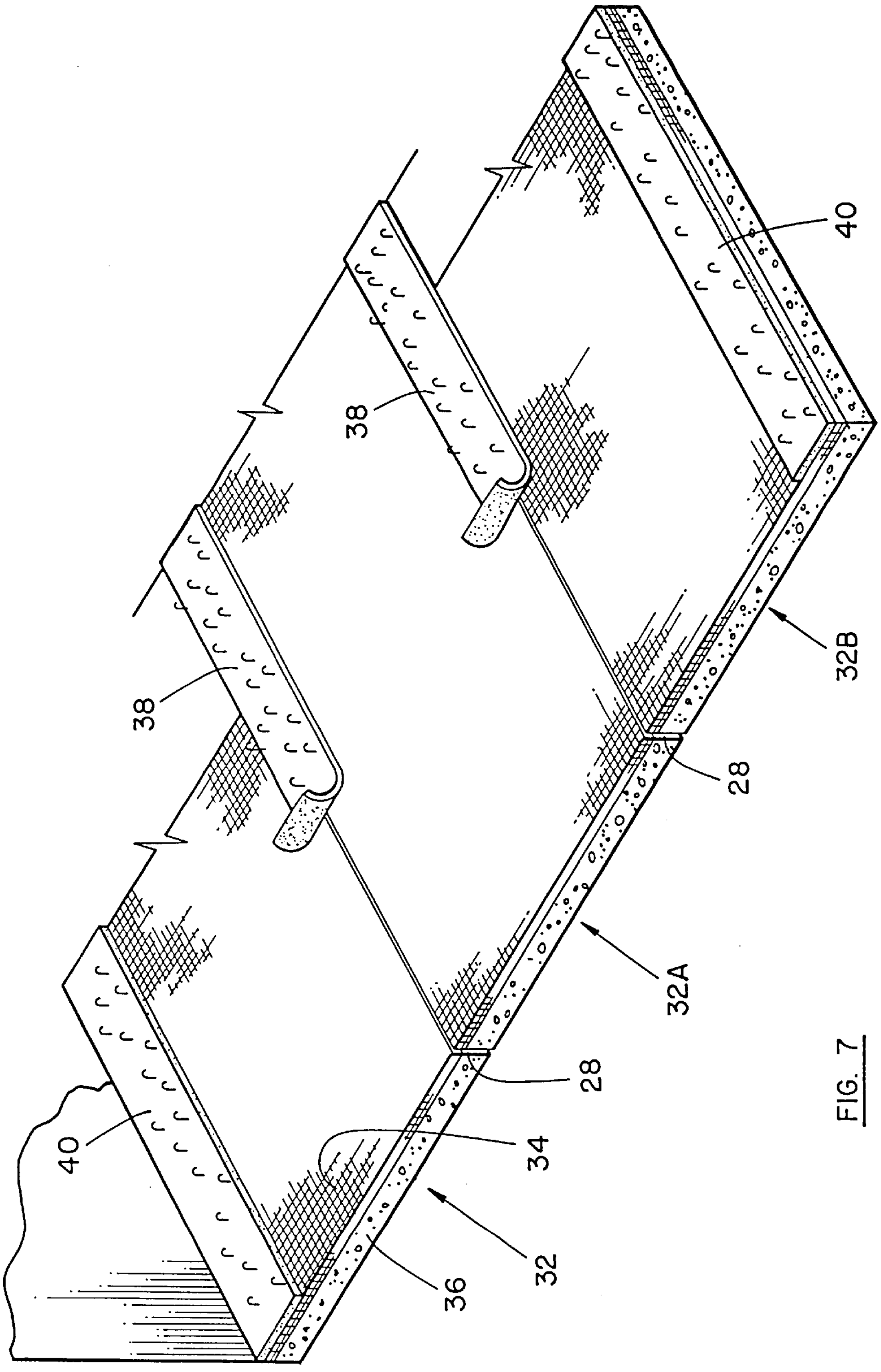
FIG. 7 shows the anchor sheet perimeter arrangement.

In FIG. 7 is shown another form of anchor sheet perimeter installation in which an anchor sheet 32 is formed having a thin rigid flexible covering 34 preferably formed of a plastic or polymer material as described in related application Ser. No. 08/850,726 preferably of a polypropylene, polycarbonate or polyester material and laminated and bonded thereto is a resilient cushion 36 of polyurehane foam or other similar carpet underpad material. Similar anchor sheet units 32A and 32B are placed on the floor in abutting relation and the units may be joined together by a pressure sensitive adhesive hooked tape 38 overlying the seams of the anchor sheets or by plain single-sided pressure sensitive tape. Additional hooked tape 40 is added to the perimeter of the anchor sheet installation to provide for a regular perimeter and seam installation as shown in U,S. Pat. No. 4,922,659. It would be convenient if the tape covering joins 41 line up with carpet seams but if they do not, additional tape can be installed on the anchor sheet 32 to provide for at least seam coverage.

Of course if plain tape is used, then hooked tape will normally have to be installed at the carpet seams. Such tape is normally covered prior to installation. Full coverage could also be provided either by adding more hooked tape or by providing anchor sheet 32 with a flexible sheet premanufactured with a complete hook covering.

Figure 7A:
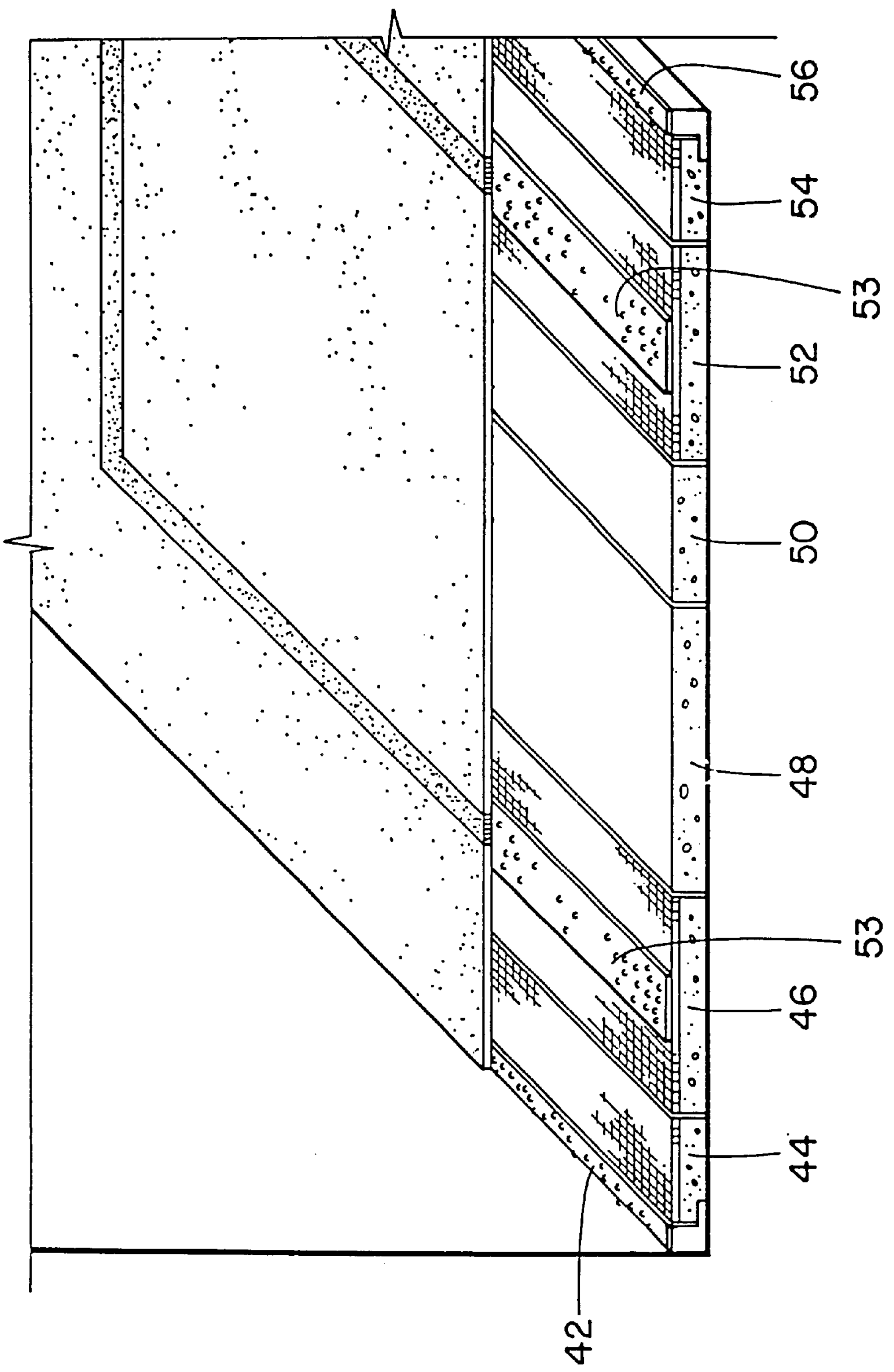
FIG. 7A shows another form of anchor sheet perimeter arrangement similar to that shown in FIG. 7.
Figure 8:
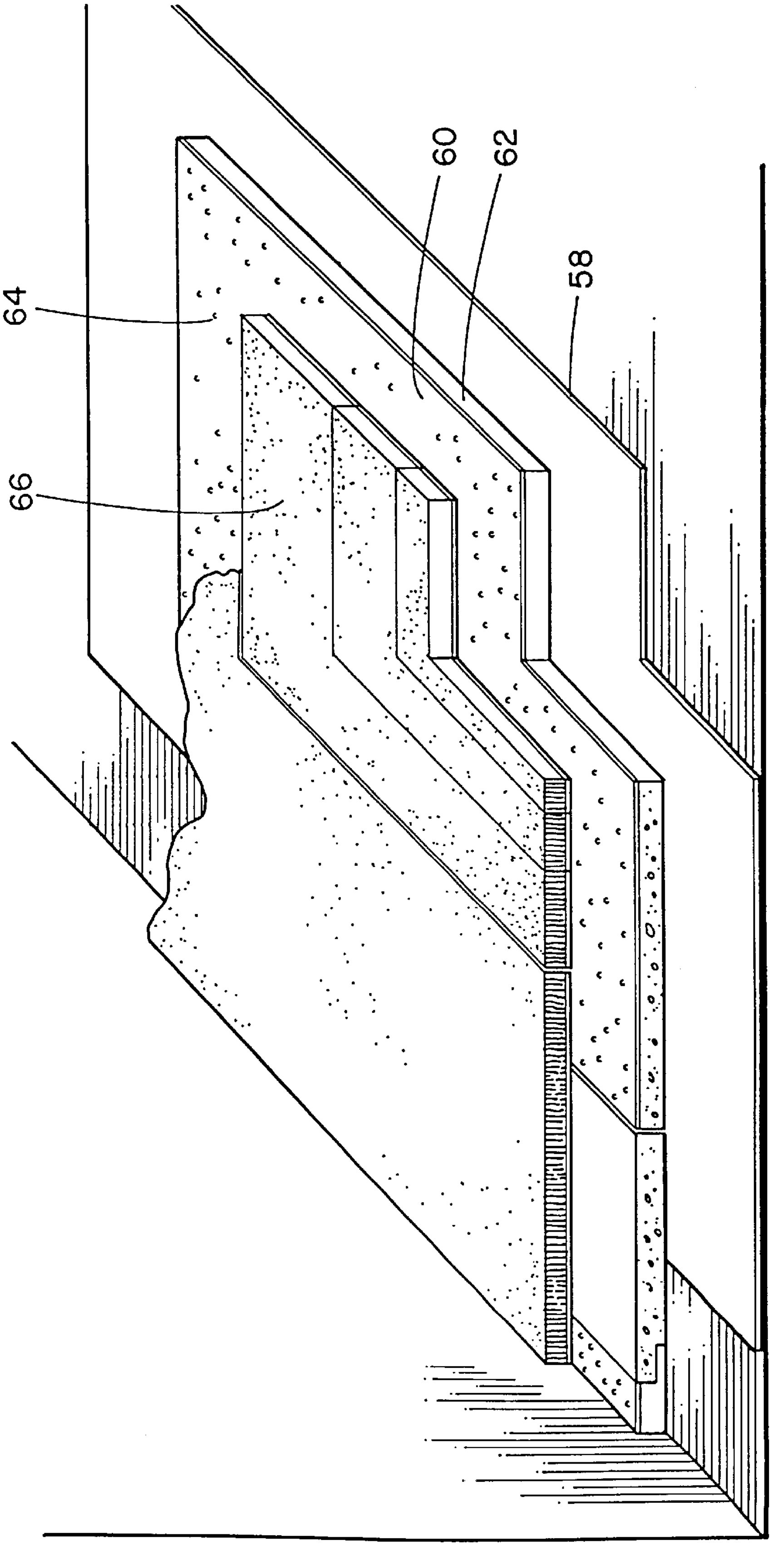
FIG. 8 shows another form of anchor sheet perimeter arrangement in which the anchor sheet carries a decorative covering which contains a border pattern.
Figure 8A:
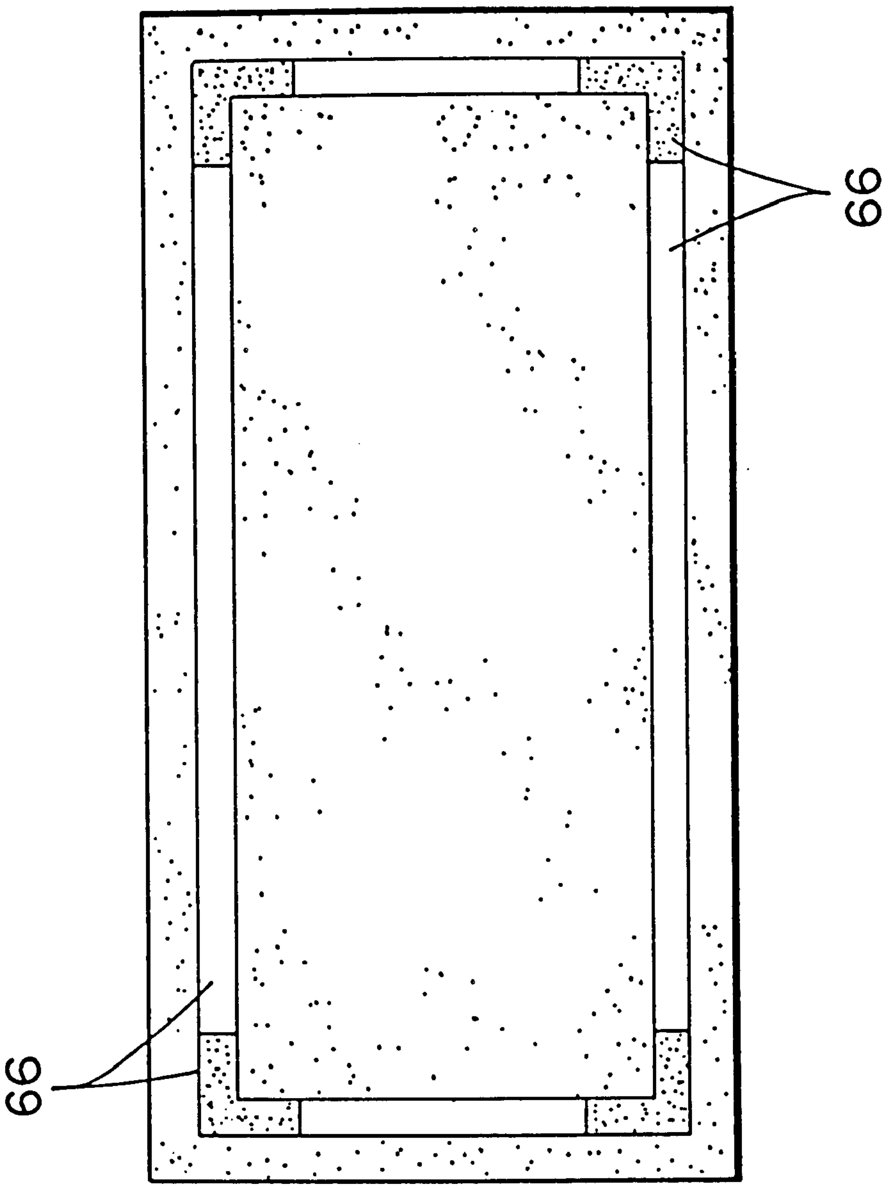
FIG. 8A shows a completed anchor sheet perimeter arrangement.

In FIG. 7A is shown an additional similar form of arrangement which combines a hooked tape 42 to be described later at the perimeter of the room, an underpad or anchor sheet with underpad 44, an additional anchor sheet with underpad 46, conventional underpads 48 and 50 and anchor sheets 52 and 54 with resilient cushioning and then tape 56. Thus a complete resilient underlayment is created which is partly a framework made by tape 42 and anchor sheets 44, 46, 52 and 54 within which are contained conventional underpads 48 and 50. A carpet can then be installed over top of this by perimeter and seam tape using tape 42 and 56 at the perimeter and tape 53 at the seams or by the use of an additional anchor sheet (not shown) to provide for decorative surface covering pieces. As shown in FIG. 8 an additional foundation sheet 58 of a similar material to the anchor sheet can have pre-attached permanently or detachably an anchor sheet 60 having a resilient undercushion 62. The anchor sheet 60 could be one as shown in related application Ser. No. 08/850,726 having its upper surface substantially covered in hooks 64, Decorative cover pieces, in this case carpet units 65, can then be installed in any pattern over the anchor sheet. In the example given in FIG. 8 they are installed in a border pattern. When fully assembled as shown in FIG. 8A such a unit can create a framework within which carpet can be installed in a conventional way, or using hook and loop or perimeter and seam or in a small enough area free floated within the area bounded by the decorative border 66 as shown in FIG. 8A.

Figure 9:
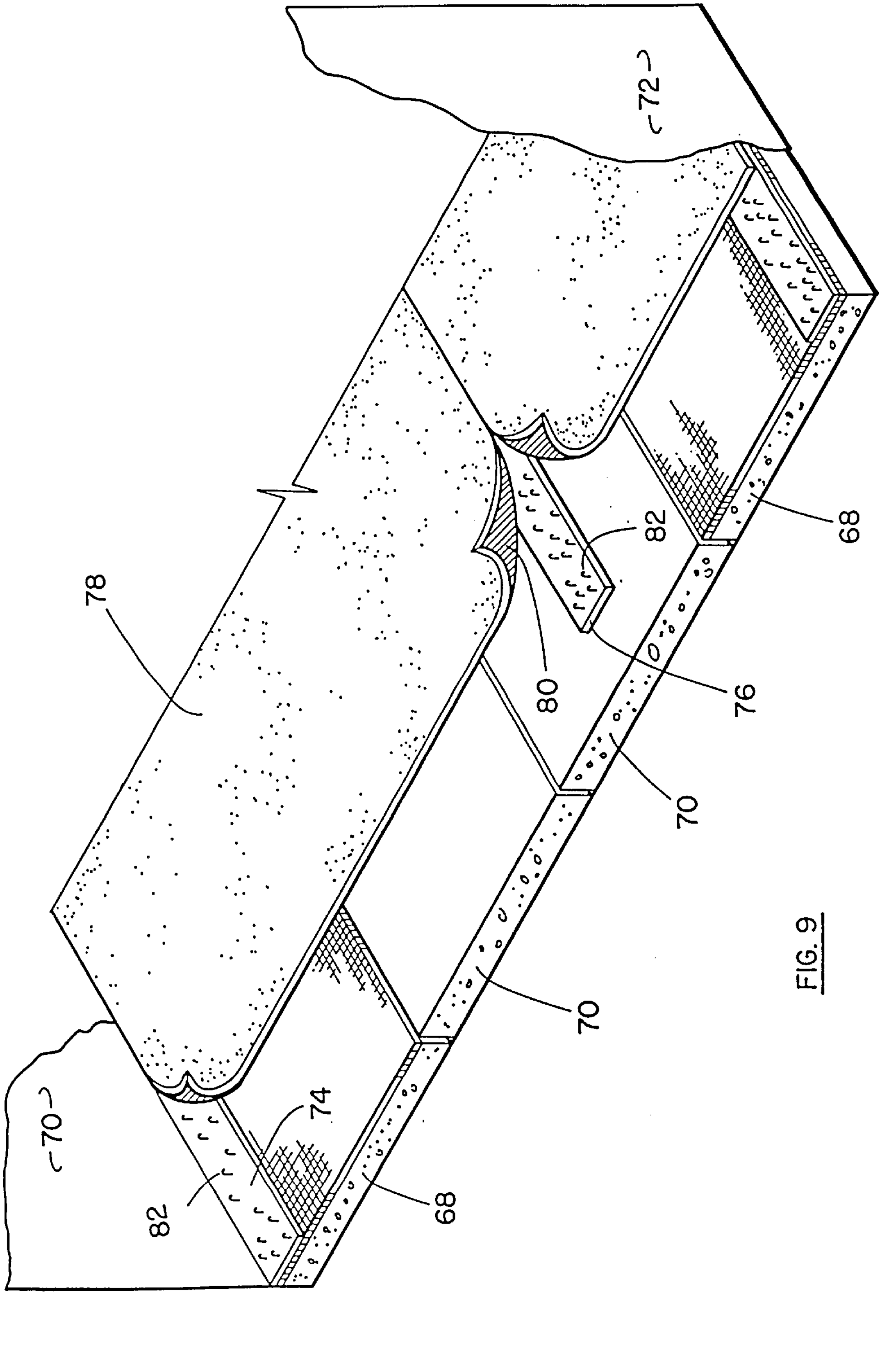
FIG. 9 shows a form of anchor sheet upon which is installed a perimeter and seam hook and loop tape arrangement.

FIG. 9 shows an arrangement similar to FIG. 7 in which there is an anchor sheet and resilient cushion framework 68 on either side of conventional carpet pads 70. The conventional carpet pads may be free floating or attached to the floor in a conventional manner. Normally if the anchor sheets 68 are on the perimeter of the room and abut, for instance, wall 71 on one side and wall 72 on the other side, the whole structure can be "free floating" in the sense that it is not attached to the floor. Hook tape 74 can be installed at the perimeter. Suspended tape 76 at the seams provides a form of perimeter and seam installation over top of a conventional cushion or a partial anchor sheet and conventional cushion. The carpet or other decorative surface covering has loops on its undersurface at 80 (not shown) for detachable attachment to hooks 81 on pieces 74 and 76.

Figure 10:
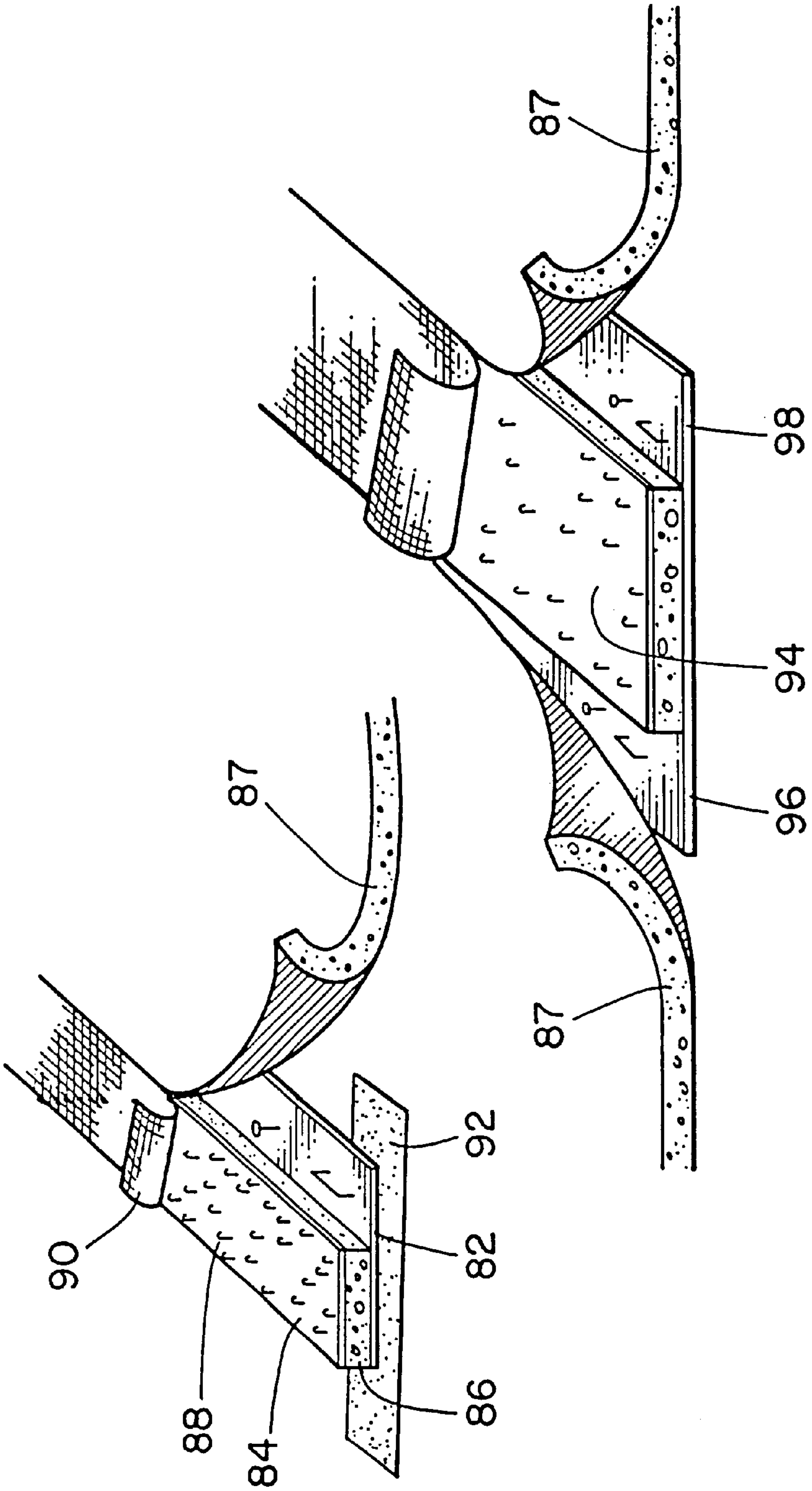
FIG. 10 shows a form of tape suitable for use in a perimeter arrangement.

FIG. 10 shows a form of hook tape that can be used to create a perimeter for the installation of a conventional underpad 87. This tape has a foundation layer 8 to which is attached the tape 84 having a resilient cushion layer 86. The tape is hook tape and contains across its surface resilient hooks 88. It normally would be supplied with a tape covering 90. The foundation sheet 82 allows for a lip or area so that the hook tape may be stapled or nailed through the sheet 82 or through tape 84 to the floor or it ran be installed using double-sided adhesive tape 92 or by hook and loop or by a conventional method.

Another form of tape 94 is also shown having foundation sheets 96 and 98 on both sides of the tape. The tape could be stapled to a floor and within the framework bounded by the tape could be inserted an appropriate underpad which could either be installed in a conventional manner or free floating between the tape gad an overlying anchor sheet or an anchor sheet having hooked covering (not shown) could also be installed within the area bounded by the tape.

Figure 11:
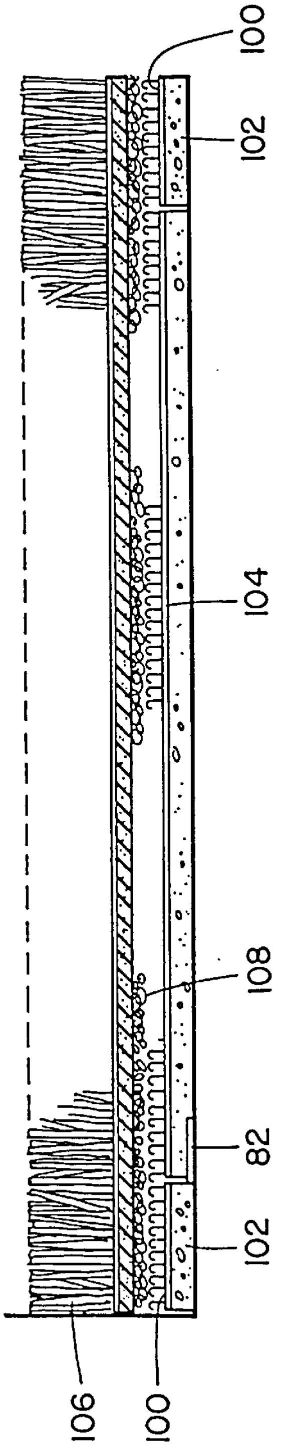
FIG. 11 shows a cross-section of a perimeter arrangement having a hooked tape bounding an area of anchor sheet and an overlying decorative covering.

In FIG. 11 is shown a cross-section of hooked tape 100 having cushion 102 attached to the floor.

If the tape is as shown in FIG. 10 it could have foundation sheet 82 for installation. Anchor sheet 104 with (as shown) or without an attached resilient cushion can then be inserted within the area bounded by hooked tape 100 and a decorative covering 106 having an undersurface covered in loops 107 could be installed across the area created by the hooked tape and anchor sheet.

Figure 12:
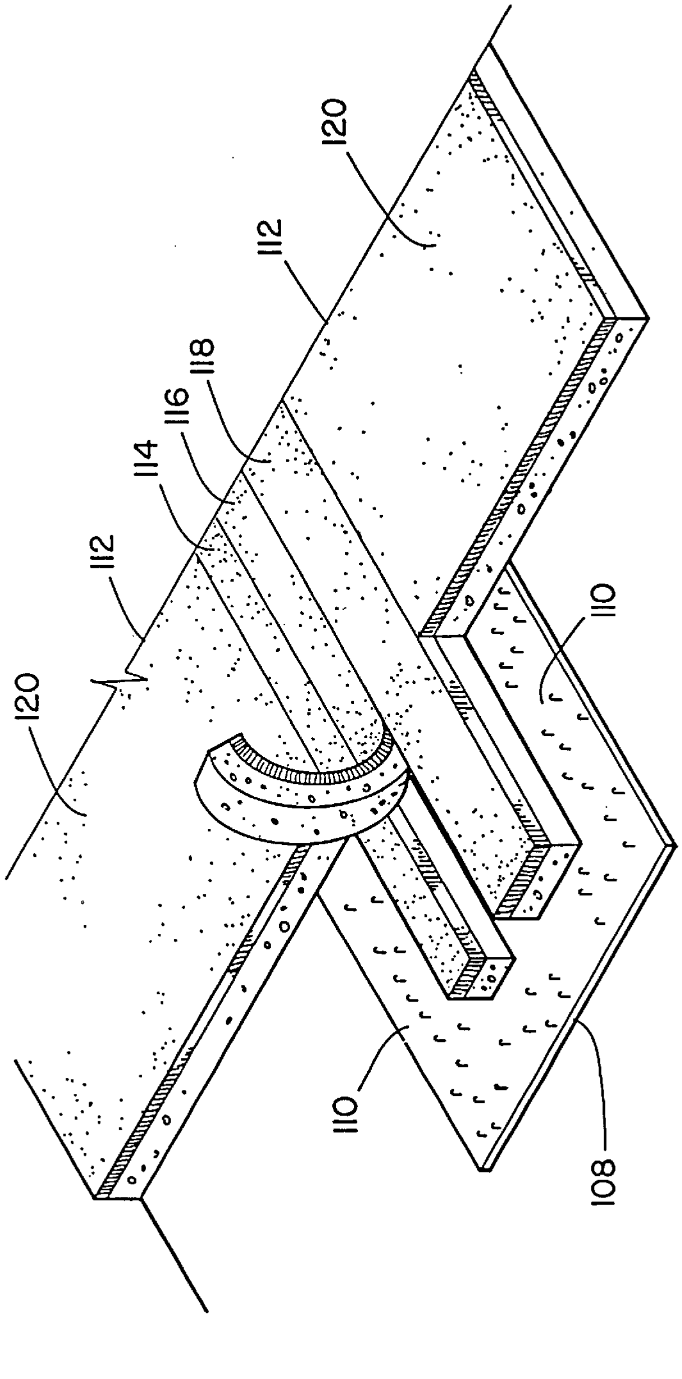
FIG. 12 shows an arrangement of anchor sheet providing a border.

FIG. 12 shows an arrangement in which an anchor sheet 108 is provided with hooks at least over the exposed area 110 shown and also under carpet pieces 112 and border pieces 114, 116 and 118. Border pieces 114, 116 and 118 may be detachably attached to anchor sheet 108 in a pattern anchor sheet and 108 with such pieces could be sold as a preassembled unit. Such piece could be attached to a floor by pressure sensitive adhesive, with hook and loop or by nailing through sheet 108. Carpet 112 having a loop backing and a pile surface 120 could then be installed and attached to hooks on anchor sheet 110.

Figure 13:
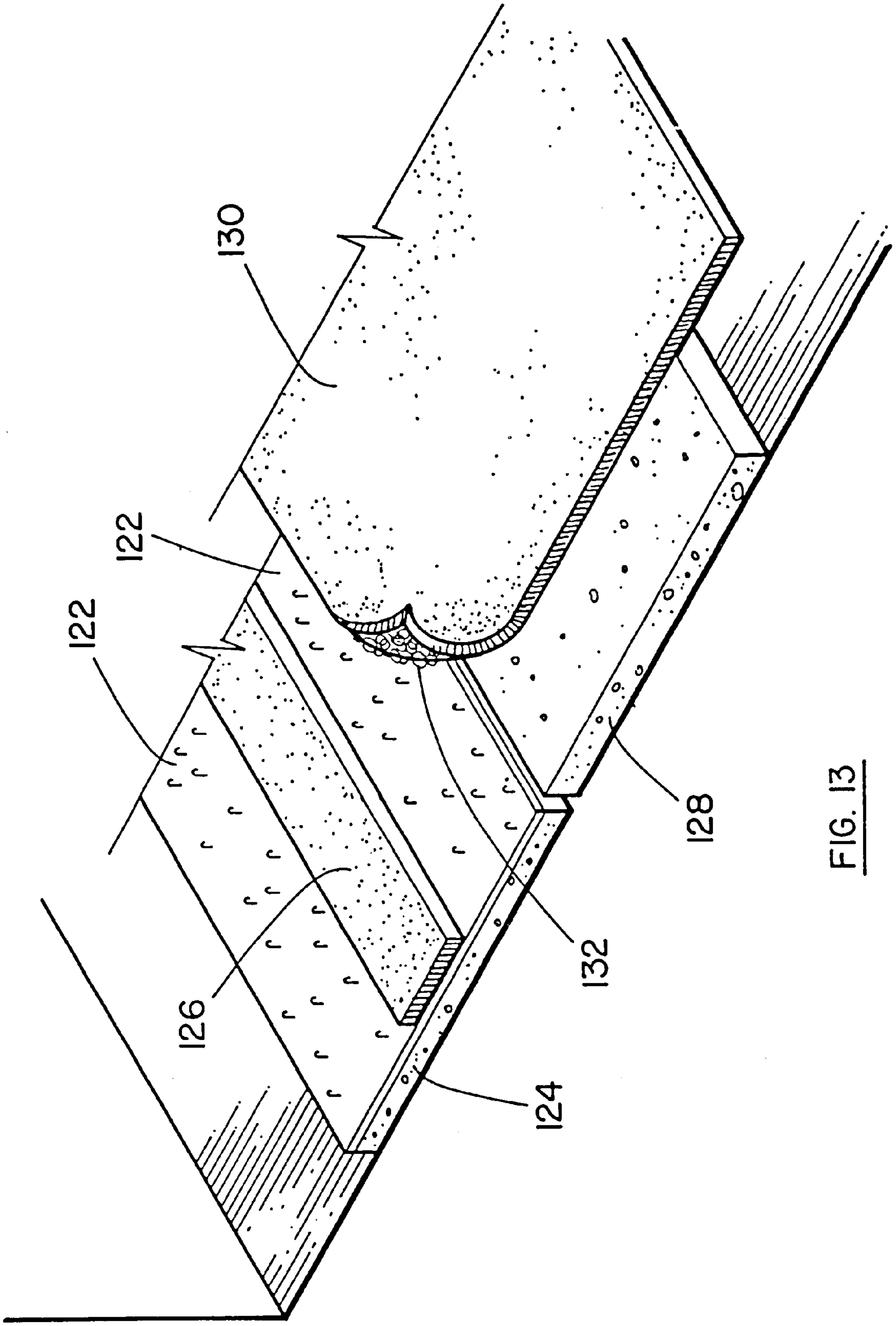
FIG. 13 shows another border arrangement with anchor sheet and cushion.

FIG. 13 shows another arrangement, in which anchor sheet 122, has a resilient cushion 124 and a carpet covering piece 126 detachably attached to the anchor sheet. A conventional cushion 128 can abut the anchor sheet and cushion and a carpet 130 having a loop backing 132 can be installed over the anchor sheet 122 and cushion 128.

It will be recognized that within the description of this present case and the related earlier pending cases many variations and permutations and combinations are possible of anchor sheet and tape with or without cushion and with or without installation directly to the floor all of which come within the spirit of the described invention as defined in the attached claims.

I claim:

1. An anchor sheet, carpet and underpad combination for installing a carpet onto a floor comprising:

(a) an anchor sheet comprising an upper sheet of a thin flexible rigid sheet and an attached lower layer of resilient cushion placed along the perimeter of an area to be covered and bounding that area (b) hook tape attached to the sheet along the perimeter of the anchor sheet (c) a resilient underpad of a height matching the height of the anchor sheet sized to fit within the area bounded by the anchor sheet (d) a carpet having an underside covered in loops detachably attached to the hook tape and extending over top of the anchor sheet and underpad.

2. A modular frame work for carpet comprising:

i) a plurality of covering modules comprising a decorative covering attached to a thin flexible rigid anchor sheet so as to leave exposed overlapping areas of anchor sheet or covering for detachable attachment in interlocking relationship to an adjoining module ii) the modules detachably interlocked to define and enclose an area.

3. The framework of claim 2 in which a carpet is cut and fit within the area defined by the covering modules.

4. An anchor sheet subfloor comprising a first bottom layer of a thin rigid flexible sheet attached to a first side of a layer of resilient material and a second layer of a thin rigid flexible sheet attached to a second opposite side of the layer of resilient material.

5. The anchor sheet of claim 4 in which the second layer has an upper surface of hooks on the side opposite the resilient material for attachment of decorative covering by complementary loops.

* * * * *